United States Patent

Tomiati

[11] 3,923,283
[45] Dec. 2, 1975

[54] FAUCET WITH CONTROLLED TORQUE CLOSURE

[76] Inventor: Umberto Tomiati, via dei Filippini, 19, Verona, Italy

[22] Filed: Aug. 5, 1974

[21] Appl. No.: 495,151

[52] U.S. Cl. .............................. 251/77; 64/DIG. 2
[51] Int. Cl.² ......................................... F16K 31/44
[58] Field of Search .......... 251/79, 80, 77, 81, 284, 251/337, 278, 227, 238, 242, 253, 263, 272, 276; 137/601; 64/DIG. 2

[56] References Cited
UNITED STATES PATENTS

| | | | |
|---|---|---|---|
| 979,344 | 12/1910 | Shallow | 251/227 |
| 2,075,959 | 4/1937 | Previti | 64/DIG. 2 |
| 2,710,164 | 6/1955 | Hare | 251/278 |
| 3,079,122 | 2/1963 | Schneider | 251/263 X |
| 3,455,331 | 7/1969 | Baumann et al. | 251/80 X |

*Primary Examiner*—Martin P. Schwadron
*Assistant Examiner*—Robert J. Miller
*Attorney, Agent, or Firm*—Guido Modiano; Albert Josif

[57] ABSTRACT

A faucet with controlled torque closure which comprises a screw type closing member operated by a knob in which between the screw type closing member and the knob there is a torque member coupled in a non-rotatable manner with the screw member and rotatable by the pull of a spring on the knob. Also provided are two rigid stops between the torque members and knob to limit the excursion of the spring between position of minimum deformation and a position of maximum deformation.

1 Claim, 5 Drawing Figures

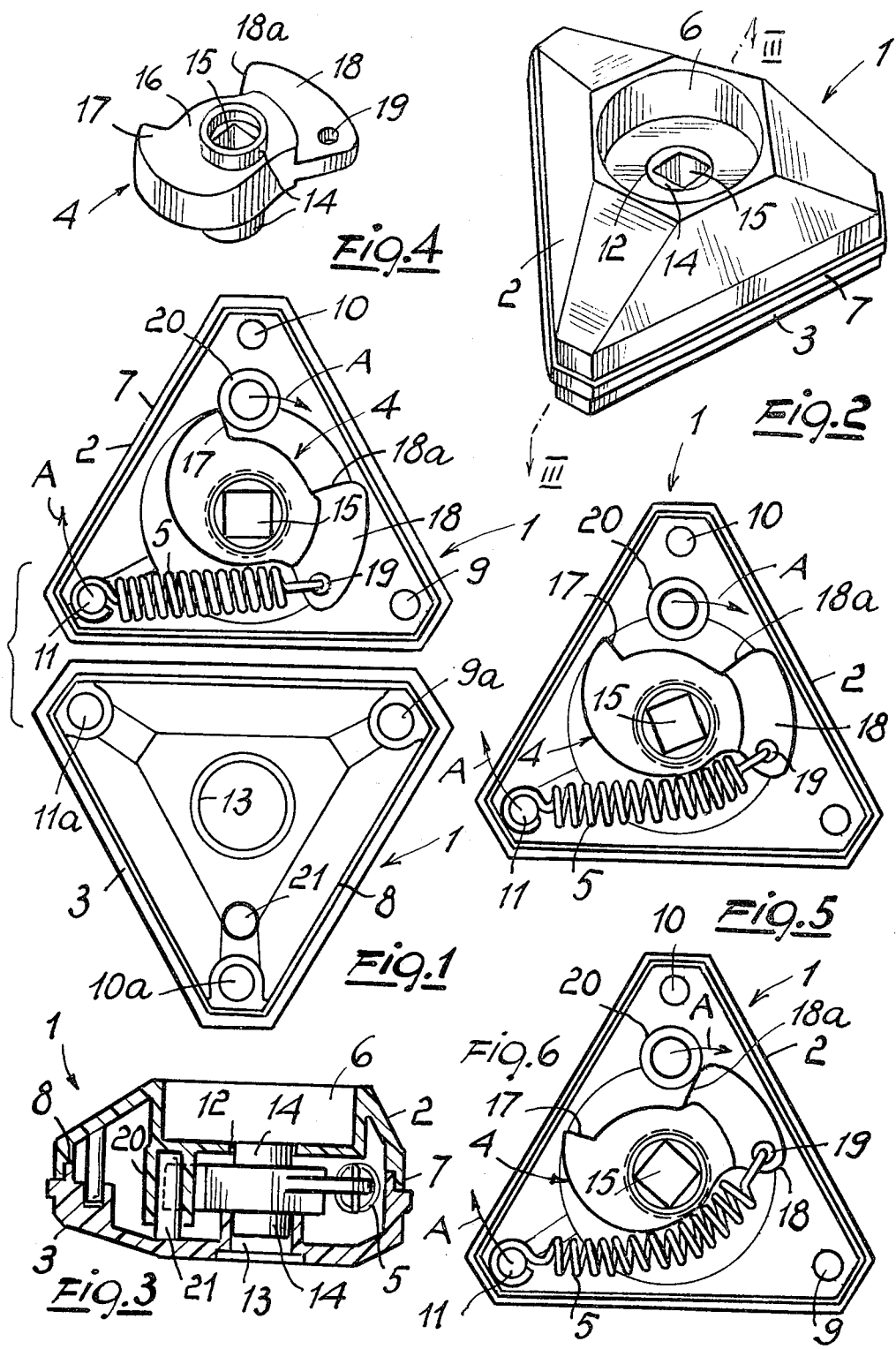

FAUCET WITH CONTROLLED TORQUE CLOSURE

BACKGROUND OF THE INVENTION

This invention relates generally to faucets, and more particularly to faucet knobs able to transmit a controlled torque during closure.

A problem not yet resolved in the case of faucets and valves in general with an isolating or isolating and regulating action is that of the life of the seal member or gasket.

Among the faucets considered for this reason, the most important are those used domestically because of their wide distribution and vital importance, because their use is not entrusted to technical personnel as in the case of industrial plant, and because there is no continuos ready supervision and maintenance scheduled for them.

In spite of the great progress made in gasket materials, especially in synthetic materials, the life of gaskets has grown shorter and has stopped at limits which seem impassable. This is due to the fact that the alteration and deterioration of the gaskets is not of a chemical nature, in which case the difficulty would already have been resolved, but is due to fatigue hardening of the material. Fatigue hardening is notably a characteristic of materials which cannot be greatly influenced, and which depends more on the environment in which the material, subjected to alternate stress, is made to work rather than on the characteristics of the material itself. From studies made of the sealing capacity of gasket material as a function of the load and duration of cyclic stress, it has been shown that the life decreases much more rapidly than the increase in the applied sealing pressure, and on the other hand the seal, measured as the inverse of the hourly leakage, increases rapidly as the closing compression increases, until it reaches a wide maximum, and then decreases for very high loads, which are in general beyond the elastic limit of the material. It is evident that in order to prolong the life of a gasket, the gasket should always be loaded at the minimum pressure which gives the required seal. But if it is difficult for technical personnel employed in operating plant to regulate the pressure with which the gasket is compressed each time, by regulating the torque applied to the knob of the faucet, it is absolutely impossible for normal domestic users to do this where the force with which a faucet is closed depends upon the strength, temperament and state of mind of the person closing it, because of which the same faucet will sometimes be left to drip and other times be closed with the gasket "crushed".

It must be stated at this point that it is impossible for the user of the faucet to objectively estimate instantaneously whether the faucet is perfectly closed. In fact, even when the faucet is closed, there is initial dripping due to the outflow of the water present downstream of the gasket. It therefore cannot be estimated whether the dripping is due to the imperfect seal of the gasket or to the outflow of the water contained in the faucet downstream of the gasket.

One idea consisted of providing an encased gasket, which projected only a certain amount and which comprised a stop ledge for limiting its deformation, as described in Italian Pat. No. 890635 of the same applicant.

A further solution able to satisfy the requirements of many users is described in Italian Pat. No. 821886 of the same applicant.

In it, the torque applicable to the screw stem of the faucet was limited by a coupling device comprising a ratchet gear, already known in many forms and applications, which is locked in the opening direction, and in the closing direction instead of operating freely with a click action as in the case of normal ratchet gears, turns freely with a click action only when the torque exceeds a certain value, as determined by opposing springs.

The greatest disadvantage of this solution is the noise generated by the ratchet pawl.

SUMMARY OF THE INVENTION

These and further objects which will be more evident hereinafter are attained by a faucet according to the present invention comprising a closing member of screw type operated by a knob in which between the closing member of screw type and the knob there is a torque member connector coupled in a non-rotatable manner with the closing member and rotatable by the pull of a spring on the knob, there being provided two rigid stops between the coupling and knob to limit the excursion of the spring between a position of minimum deformation and a position of maximum deformation.

BRIEF DESCRIPTION OF THE DRAWINGS

The characteristics and advantages of the invention will be more evident from the description of a preferred but not exclusive embodiment given by way of non-limiting example with reference to the accompanying drawing, in which:

FIG. 1 is a view from above of an open knob of a faucet according to the invention, with a cover part inverted;

FIG. 2 is a perspective view of the same inverted knob;

FIG. 3 is a section on the line III—III of FIG. 2;

FIG. 4 is a perspective view of the torque member according to the invention;

FIG. 5 shows the knob of FIG. 1 during a stage of operation; and FIG. 6 shows the same knob during an extreme stage of operation.

DESCRIPTION OF A PREFERRED EMBODIMENT

In the drawing the reference numeral 1 indicates generally a knob which comprises the device for faucets according to the invention. The knob comprises a box body 2, of triangular plan with chamfered corners, a cover 3, a torque member 4 and a spring 5. On the lower part the box body 2 comprises a cylindrical recess for mounting on a faucet. For its fixing to the cover, the body 2 comprises a rim 7 into which a corresponding rim 8 of the cover is inserted, and three projecting pins 9, 10 and 11 which are inserted into corresponding guide seats 9a 10a and 11a in the cover. On the axis of rotation of the knob there are two opposing holes 12 and 13 in the body and cover respectively, which serve as bearings for the rotatable support of the torque member 4 which is inserted into them by its hollow cylindrical shaft part 14, the cavity 15 of which is of normal square cross-section for mounting on a screw type closing member of a faucet. The torque member 4, which functions as an anchor, comprises in the centre of its shaft part a tick shaped collar projection 16, with a tooth projection or abutment 17 and a thinner appendix 18 comprising an abutment edge 18a opposing the tooth 17 at an angle, and in which there is a hole 19 for hooking the spring 5. The torque member is rotatably mounted in the box body in such a manner that when it rotates, the tooth 17 and ledge 18a can abut respectively against a stop or finger 20 consisting of a cylinder projecting innerly in the box body, close to the pin 10, which acts as the limit stop for the rotation of the torque member with respect to the knob in both directions. A pin 21 projecting from the cover is inserted into the cylinder 20 for strengthening purposes. The spring hooked into the hole 19 of the torque member has its other end fixed to the pin 11, so determining the rest position of the torque member, with the tooth 17 resting against the pin or stop 20.

The method of operation of a faucet according to the invention, to obtain the seal and preserve the gasket, is evident.

In the position in which the knob is not engaged, as shown in FIG. 1, the spring 5 is loaded with a certain tension. As the faucet is opened, the stop or finger 20 of the knob abuts against the abutment tooth 17 and the knob rigidly drags the screw type closing member through the torque member. When the knob is rotated to close the faucet, it tends to drag the torque member 4 by means of the spring 5 which is pulled by the pin 11 in the direction indicated by the arrow A. The tension of the spring, for example approximately 5 Kg, is predetermined so as to transmit to the screw type closing member a torque which compresses the gasket by a minimum force capable of ensuring a good seal. When the faucet has been closed by the predetermined force, the resistant torque exceeds the torque produced by the spring, and this latter is no longer able to drag the screw member, and if the knob is further rotated, the spring extends as shown in FIG. 5 until after further rotation it assumes the position shown in FIG. 6, with the stop cylinder 20 engaged against the abutment edge 18a of the torque member. If it is further rotated from this position in the closure direction, the knob rigidly takes with it the coupling 4 and the screw member of the faucet. As the faucet according to the invention is closed or screwed down, three distinct stages are distinguished: a first stage in which the compression of the gasket begins from zero and grows to a predetermined value, determined by the initial tension of the spring; a second stage in which the gasket compression increases beyond the predetermined limit in an adjustable manner, the value of which can be estimated by the increased tension of the spring; and a third stage in which the knob rigidly drags the closing member and transmits torques which are beyond control limits.

The hand, operating the faucet, can sense very distinctly the beginning of each stage and the passage to the next stage, aided by the fact that when the spring is put under greater traction, it pulls the knob backwards as soon as the hand is taken away. All users of the faucet according to the invention therefore easily become accustomed to closing the faucet exactly to the end of the first stage, which is sharply marked by the beginning of the spring return action of the knob. This regulated pressure on the gasket ensures a perfect seal with maximum gasket life. If, as conditions of the seat or gasket alter, leakage occurs when the faucet is tightened to the normal level, the force can be increased in a controlled manner so as to further use the gasket until the third closing stage is reached. At this point, the gasket must be replaced, but in the meantime the faucet enables forced compression to be applied in order to obtain a seal of "emergency" type.

The fact that the ledge 18a engages against the stop cylinder 20 allows the faucet to be closed even if the spring is damaged or becomes unhooked from its supports.

The operation during the second stage corresponds to a ratchet type faucet which operates with the ratchet spring set for gradually increasing forces, but with two evident advantages over this latter during this stage: firstly that of eliminating the difficulty of continually setting the spring, and subsequently of not having to reset the initial conditions after replacing the gasket.

A further important practical advantage over ratchet type faucets is also obtained. In these latter, the release movement of the ratchet gear is defined by the pressure of a spring and the friction between teeth or the like; however the friction conditions notably vary greatly with wear etc. In the faucet according to the invention, the torque during the first and second stages is defined directly by the tension of the spring, and is thus perfectly reproducible.

The invention has been described with constructional details, but it is evident that many embodiments may be constructed by experts which reproduce the same concept; these modifications all fall within the scope of the invention. The materials may be chosen from those suitable for each part.

I claim:

1. A faucet knob device for faucets of the type having a screw type closing member to which the faucet device is adapted to transmit a controlled torque closing action, the knob device comprising a torque member having a shaft portion adapted for rigid rotatory connection coaxial with said screw type closing member, said shaft portion having external cylindrical bearing surface portions coaxial therewith, a knob head member having means integral therewith for slidably engaging said bearing surface portions in independent coaxial rotatory relationship therewith, spring means having one end thereof connected to said torque member in a point at a distance from the axis of said shaft portion and having the other end thereof connected to said knob head member in a point offset with respect to said shaft portion thereby to drag into rotation said torque member through said spring when said knob head member is rotated in a direction against the action of said spring and to transmit through said spring a torque creating force on said torque member when said spring is tensioned, a pair of opposite axially offset abutment means on said torque member and arranged circumferentially at a distance from one another to define a free space therebetween, a finger member rigid with said knob head member and protruding into said free space, said finger member being adapted to abut against one of said opposite abutment means when said knob head member is rotated by hand in the closing direction of said closing member against the action of said spring thereby to transmit first a spring controlled action to said torque member and to transmit thereafter rigidly the torque force from the hand action onto said closing member through the contact between said finger member and said one of said opposite abutment means, said finger member being further adapted to abut against the other of said opposite abutment means when the knob member is released from the hand action and the spring urges said head member to rotate idly in the opposite direction to bring said finger member in stopping engagement with said other of said opposite abutment means and to allow said closing member to be opened when an opposite hand action torque is transmitted rigidly from said knob head member to said other of said opposite abutment means through said finger member.

* * * * *